United States Patent
Ito et al.

(10) Patent No.: US 10,670,344 B2
(45) Date of Patent: Jun. 2, 2020

(54) HEAT EXCHANGER, AIR-CONDITIONING APPARATUS, REFRIGERATION CYCLE APPARATUS AND METHOD FOR MANUFACTURING HEAT EXCHANGER

(71) Applicant: Mitsubishi Electric Corporation, Tokyo (JP)

(72) Inventors: Daisuke Ito, Tokyo (JP); Akira Ishibashi, Tokyo (JP); Takashi Okazaki, Tokyo (JP); Shinya Higashiiue, Tokyo (JP); Takuya Matsuda, Tokyo (JP); Atsushi Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 951 days.

(21) Appl. No.: 14/909,478

(22) PCT Filed: Aug. 4, 2014

(86) PCT No.: PCT/JP2014/070502
§ 371 (c)(1),
(2) Date: Feb. 2, 2016

(87) PCT Pub. No.: WO2015/025702
PCT Pub. Date: Feb. 26, 2015

(65) Prior Publication Data
US 2016/0169586 A1    Jun. 16, 2016

(30) Foreign Application Priority Data
Aug. 20, 2013 (WO) .................. PCT/JP2013/072211

(51) Int. Cl.
*F28D 1/053* (2006.01)
*F24F 13/30* (2006.01)
(Continued)

(52) U.S. Cl.
CPC .......... *F28D 1/05333* (2013.01); *B23P 15/26* (2013.01); *F24F 13/30* (2013.01);
(Continued)

(58) Field of Classification Search
CPC ............. F28D 1/05333; F28D 1/05383; F28D 1/05391; F28D 2001/0273; F28D 1/047;
(Continued)

(56) References Cited

U.S. PATENT DOCUMENTS 2,252,064 A * 8/1941 Cornell, Jr. ........... F24F 1/0007
237/49
2,820,617 A * 1/1958 Tadewald ................ F28D 1/047
165/153

(Continued)

FOREIGN PATENT DOCUMENTS

EP         2037199 A1   3/2009
JP      05-203285 A     8/1993
(Continued)

OTHER PUBLICATIONS

International Search Report of the International Searching Authority dated Oct. 21, 2014 for the corresponding international application No. PCT/JP2014/070502 (and English translation).

*Primary Examiner* — Tho V Duong
*Assistant Examiner* — Raheena R Malik
(74) *Attorney, Agent, or Firm* — Posz Law Group, PLC

(57) ABSTRACT

A heat exchanger includes: a heat exchange unit group made up of a plurality of heat exchange units arranged in a row direction, the heat exchange units including a plurality of heat transfer tubes configured to allow refrigerant to pass therethrough, the heat transfer tubes being arrayed in a level direction, the level direction being perpendicular to the direction of air flow, and a plurality of fins stacked to allow air to pass therethrough in the air flow direction; and (Continued)

headers, disposed on both ends of the heat exchange unit group, the headers being connected with ends of the plurality of heat transfer tubes, the heat exchange unit group including one or more bend sections bent in the row direction, the headers including one header provided on one end of the heat exchange unit group in common for the plurality of rows of the heat exchange units, and a plurality of separate headers provided separately for the heat exchange units on the other end of the heat exchange unit group, the plurality of separate headers being arranged at positions different between adjacent rows, the positions being different in a fin-stacking direction in which the plurality of fins are stacked.

12 Claims, 10 Drawing Sheets

(51) Int. Cl.
    *F28F 1/02*     (2006.01)
    *B23P 15/26*     (2006.01)
    *F28F 1/22*     (2006.01)
    *F28D 1/02*     (2006.01)

(52) U.S. Cl.
    CPC ..... *F28D 1/05383* (2013.01); *F28D 1/05391* (2013.01); *F28F 1/022* (2013.01); *F28F 1/22* (2013.01); *F28D 2001/0273* (2013.01)

(58) Field of Classification Search
    CPC .... F28D 1/0471; F28D 1/0475; F28D 1/0476; F28D 1/0477; F28D 1/0478; B23P 15/26; F24F 13/30; F28F 1/22; F28F 1/022; F28F 2009/004; F28F 9/027
    USPC ........................................................ 165/150
    See application file for complete search history.

(56) References Cited

U.S. PATENT DOCUMENTS

| | | | | |
|---|---|---|---|---|
| 4,173,998 A * | 11/1979 | Jahoda | ................ | B21D 53/085 165/150 |
| 5,267,610 A * | 12/1993 | Culbert | ................ | B21D 53/085 165/151 |
| 5,279,360 A * | 1/1994 | Hughes | ................ | F25B 39/02 165/111 |
| 6,672,375 B1 * | 1/2004 | Shippy | ................ | F24F 1/0059 165/122 |
| 7,793,514 B2 * | 9/2010 | Rios | ................ | F24F 13/222 62/285 |
| 9,618,229 B2 * | 4/2017 | Shiborino | ................ | F24F 1/16 |
| 9,689,594 B2 * | 6/2017 | Johnson | ................ | F25B 39/028 |
| 9,752,833 B2 * | 9/2017 | Gao | ................ | F25B 39/02 |
| 10,060,687 B2 * | 8/2018 | Wu | ................ | F28D 1/0435 |
| 2008/0173434 A1 * | 7/2008 | Matter | ................ | F28D 1/0417 165/150 |
| 2013/0312451 A1 * | 11/2013 | Max | ................ | F28D 1/05333 62/498 |
| 2014/0290923 A1 * | 10/2014 | Huelsmann | ........... | F28F 9/0214 165/174 |
| 2014/0326435 A1 * | 11/2014 | Peppard | ................ | F28F 9/001 165/76 |

FOREIGN PATENT DOCUMENTS

| | | |
|---|---|---|
| JP | 06-002016 U | 1/1994 |
| JP | 07-002859 U | 1/1995 |
| JP | 09-196507 A | 7/1997 |
| JP | 11-108567 A | 4/1999 |
| JP | 2001-021284 A | 1/2001 |
| JP | 2001-133187 A | 5/2001 |
| JP | 2002-333294 A | 11/2002 |
| JP | 2002-340485 A | 11/2002 |
| JP | 2003-075024 A | 3/2003 |
| JP | 2003-161589 A | 6/2003 |
| JP | 2004-286246 A | 10/2004 |
| JP | 2005-321151 A | 11/2005 |
| JP | 2011-080704 A | 4/2011 |
| JP | 2013-127341 A | 6/2013 |
| WO | 2008/041656 A1 | 4/2008 |
| WO | 2011/126488 A2 | 10/2011 |

\* cited by examiner (a)

(b)

(c)

(a)

FIN-STACKING DIRECTION (b)

FIN-STACKING DIRECTION

HEAT EXCHANGER, AIR-CONDITIONING APPARATUS, REFRIGERATION CYCLE APPARATUS AND METHOD FOR MANUFACTURING HEAT EXCHANGER

CROSS REFERENCE TO RELATED APPLICATION

This application is a U.S. national stage application of International Application No. PCT/JP2014/070502 filed on Aug. 4, 2014, which claims priority to International Application No. PCT/JP2013/072211 filed on Aug. 20, 2013, the disclosures of which are incorporated herein by reference.

TECHNICAL FIELD

The present invention relates to a heat exchanger, an air-conditioning apparatus, a refrigeration cycle apparatus and a method for manufacturing a heat exchanger.

BACKGROUND ART

A conventional technique is known in which a plurality of heat exchange units each made up of a plurality of fins and a plurality of heat transfer tubes are arranged in a row direction, the row direction being a direction of air flow in order to improve heat exchange efficiency (for example, see Patent Literature 1).

In Patent Literature 1, headers are provided on each of ends of a heat exchange unit group made up of two heat exchange units in common for both heat exchange units, and each header is connected to the respective ends of the heat transfer tubes.

Further, a heat exchanger is disclosed in which a heat exchange unit is bent in L-shape, U-shape or the like to fit for the size of a casing of an indoor unit of an air-conditioning apparatus so that the heat exchange unit is housed in the casing to save a space (for example, see Patent Literature 2).

CITATION LIST

Patent Literature

Patent Literature 1: Japanese Unexamined Patent Application Publication No. 2003-75024 (Abstract, FIG. 1)
Patent Literature 2: Japanese Unexamined Patent Application Publication No. 2003-161589 (page 6, FIG. 6)

SUMMARY OF INVENTION

Technical Problem

In general, such a header having a simple configuration as described in Patent Literature 1 is used as a distributor to distribute refrigerant into the heat transfer tubes of the heat exchanger. In the heat exchanger using the header of this type, however, when the heat exchange unit group having a configuration of a plurality of rows is to be bent in order to save a space as described in Patent Literature 2, the bending radius of inner rows is small and the bending radius of outer rows is large. For this reason, the heat exchanger group can not be bent to form a bend section after the heat exchange unit group is brazed to the headers disposed on both ends of the heat exchange unit group since both ends of the heat exchange unit group are constrained in position by the headers.

As a solution for the above problem, the heat transfer tube and the fin may be brazed to form the heat exchange unit group and then the headers may be connected to the heat exchange unit group after the bend section is formed in the heat exchange unit group. However, this solution causes increase in the cost since the headers needs to be brazed again after brazing whole of the heat exchange unit group. This increases the number of times of the brazing process, thereby reducing the productivity and increasing the cost. Further, re-brazing of the header is a process of partially brazing the header and the respective heat transfer tubes, which needs to be performed independently for the respective heat transfer tubes. As a consequence, the brazing process needs to be performed for the increased number of positions, which is inefficient. Furthermore, the re-brazing process has a problem that the braze formed by the first brazing process is melted by the second brazing process, which may cause insufficient brazing, and the reliability is lowered due to damaging to the material caused by thermal change.

The present invention has been made to overcome the above problem, and an object of the present invention is to provide a heat exchanger, an air-conditioning apparatus, a refrigeration cycle apparatus and a method for manufacturing the heat exchanger, in which the bend section can be formed after the heat exchange unit group is brazed to the headers, with reduction in manufacturing cost can be reduced with increase in productivity.

Solution to Problem

A heat exchanger according to the present invention includes A heat exchanger comprising: a heat exchange unit group made up of a plurality of heat exchange units arranged in a row direction, the row direction being a direction of air flow, the heat exchange units including a plurality of heat transfer tubes configured to allow refrigerant to pass therethrough, the heat transfer tubes being arrayed in a level direction, the level direction being perpendicular to the direction of air flow, and a plurality of fins stacked to allow air to pass in the air flow direction; and headers disposed on both ends of the heat exchange unit group, the headers being connected with ends of the plurality of heat transfer tubes, the heat exchange unit group including one or more bend sections bent in the row direction, the headers including one header provided on one end of the heat exchange unit group in common for the plurality of rows of the heat exchange units, and a plurality of separate headers provided separately for each of the heat exchange units on the other end of the heat exchange unit group, the plurality of separate headers being arranged at positions different between adjacent rows, the positions being different in a fin-stacking direction in which the plurality of fins are stacked.

Advantageous Effects of Invention

According to the present invention, since the header on one end of the heat exchange unit group is one header provided in common for the plurality of rows of the heat exchange units and the header on the other end of the heat exchange unit group is made up of a plurality of separate headers separate headers independent for each of the heat exchange units, the bend section can be formed after brazing of the heat exchange unit group and the headers. Accordingly, the heat exchanger capable of reducing the manufacturing cost with increase in productivity can be provided.

DESCRIPTION OF EMBODIMENTS

Figure 1:
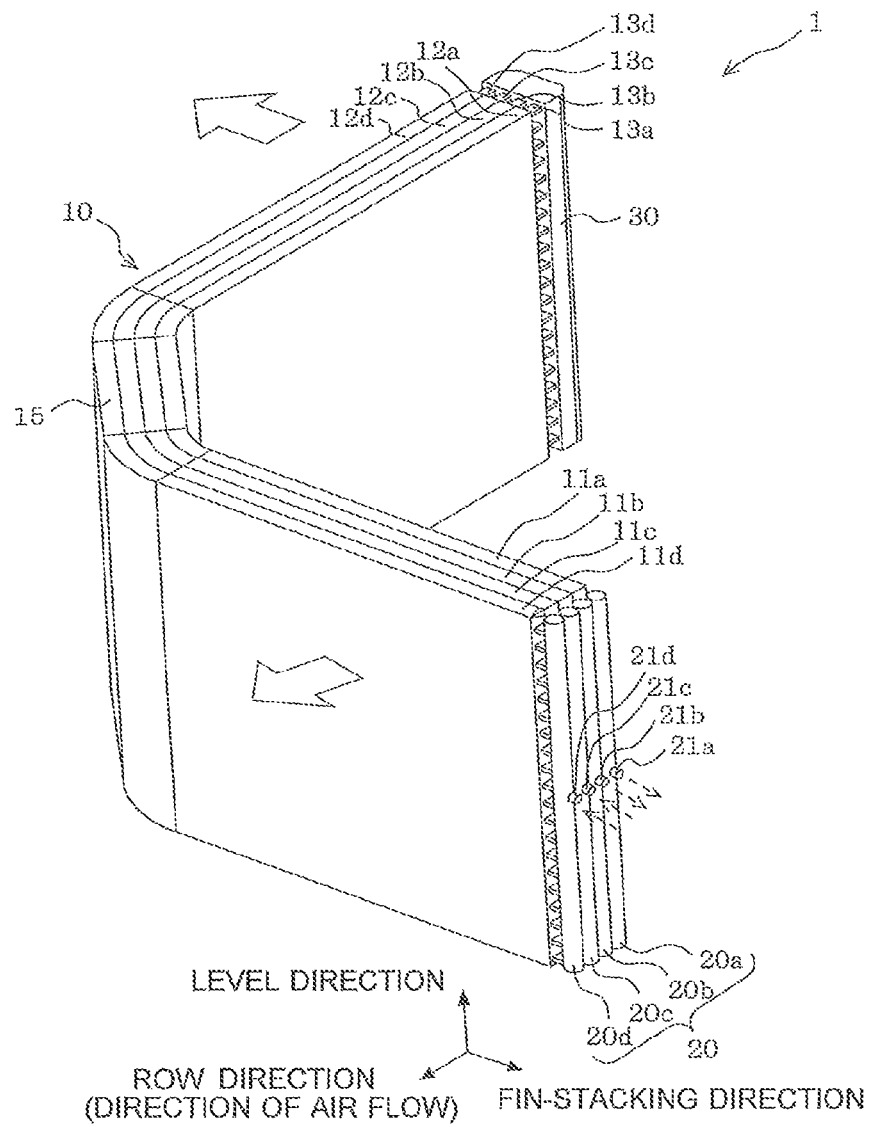
FIG. 1 is a view showing a configuration of a heat exchanger according to Embodiment 1 of the present invention.

With reference to the drawings, Embodiment of the present invention will be described. The drawings are not intended to limit the present invention. Further, the same reference numbers in the drawings herein refer to the same or corresponding elements throughout the specification.

Embodiment 1

<Configuration of Heat Exchanger>

A heat exchanger according to Embodiment 1 will be described.

Figure 2:
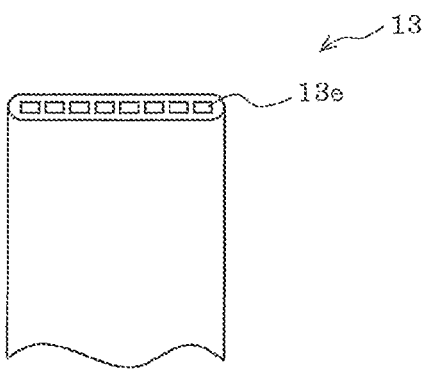
FIG. 2 is a view showing a heat transfer tube of the heat exchanger according to Embodiment 1 of the present invention.

FIG. 1 is a view showing a configuration of a heat exchanger according to Embodiment 1 of the present invention. The white arrow in FIG. 1 shows a flow of air. Further, FIG. 1 shows three axes of a row direction, a fin-stacking direction and a level direction that are orthogonal to each other. Further, the dotted arrows in FIG. 1 indicate flow directions of refrigerant which flows in the heat exchanger as an opposed flow. FIG. 2 is a view showing a heat transfer tube of the heat exchanger according to Embodiment 1 of the present invention.

As shown in FIG. 1, the heat exchanger 1 includes a heat exchange unit group 10 and headers 20 and 30 which are disposed on both ends of the heat exchange unit group 10. The heat exchange unit group 10 is made up of a plurality of heat exchange units 11a to 11d (hereinafter, these may be collectively referred to simply as heat exchange unit 11) arranged in the row direction, the row direction being a direction of air flow (air flow direction). Although FIG. 1 shows by example the heat exchange unit 11 having four rows, the number of rows may be changed depending on a desired heat exchange amount. Further, the heat exchange unit group 10 is bent in the row direction to form a bend section 15. Although FIG. 1 shows one bend section 15, two or more bend sections may be provided.

The heat exchange units 11a to 11d include a plurality of fins 12a to 12d (hereinafter, these may be collectively referred to simply as "the fin 12") and a plurality of heat transfer tubes 13a to 13d (hereinafter, these may be collectively referred to simply as "the heat transfer tube 13"). A plurality of fins 12 are stacked with spacing from each other to allow air to pass through between the fins in the row direction. The heat transfer tubes 13 extend through a plurality of fins 12 in the fin-stacking direction and are configured to allow refrigerant to flow through the heat transfer tubes. A plurality of heat transfer tubes are provided to stack in the level direction, the level direction being perpendicular to the direction of air flow. The fin 12 may be a plate fin or may be a corrugated fin in which the fins and the heat transfer tubes 13 are alternatively stacked in the level direction. In other words, any fin is applicable as long as it allows air to pass through in the row direction. Further, as shown in FIG. 2, the heat transfer tube 13 herein is formed of a flat tube having a plurality of through holes 13e that serve as a refrigerant flow path.

The header 30 is provided on one end of the heat exchange unit group 10 in common for a plurality of rows of the heat exchange units 11 such that one end of the heat transfer tubes of the respective heat exchange units 11 is connected to the header 30. That is, the header 30 is disposed to extend across a plurality of rows of the heat exchange units 11.

The header 20 is provided on the other end of the heat exchange unit group 10 and is made up of separate headers 20a to 20d which are independent for each of the heat exchange units. The separate headers 20a to 20d are each connected to the other end of the heat transfer tubes 13 of the corresponding heat exchange units 11. Further, the separate headers 20a to 20d are provided with inlet or outlet ports 21a to 21d.

In manufacturing of the heat exchanger 1 having the above configuration, the header 20 and the header 30 are disposed on both ends of the straight-shaped heat exchange unit group 10. Then, the fins 12 of the heat exchange unit group 10, the heat transfer tubes 13, the headers 20 and the header 30 are brazed to each other. After that, the heat exchange unit group 10 is bent in the row direction to form the bend section 15. In forming the bend section 15, a bending process is performed while the end of the heat exchange unit group 10 which is adjacent to the header 30 is fixed in position.

In the conventional techniques, the headers are provided on both ends of the heat exchange unit group in common for the respective heat exchange units. Accordingly, both ends of the heat exchange unit group are constrained by the headers after brazing the whole of the units. As a result, the heat exchanger can not be bent after brazing and the bend section can not be formed.

On the other hand, in Embodiment 1, one of the headers (headers 20) on both ends of the heat exchange unit group 10 is configured to be independent for each of the heat exchange units 11. Accordingly, it is possible to bend the heat exchange unit group 10 regardless of the difference in bending radius between the innermost row and the outermost row when the heat exchange unit group 10 is bent in the row direction. This allows for manufacturing of the heat exchanger 1 having the bend section 15 with a single brazing process, and eliminates the need for the conventional two times of brazing. Accordingly, the heat exchanger 1 can be provided with low cost and high reliability.

Figure 3:
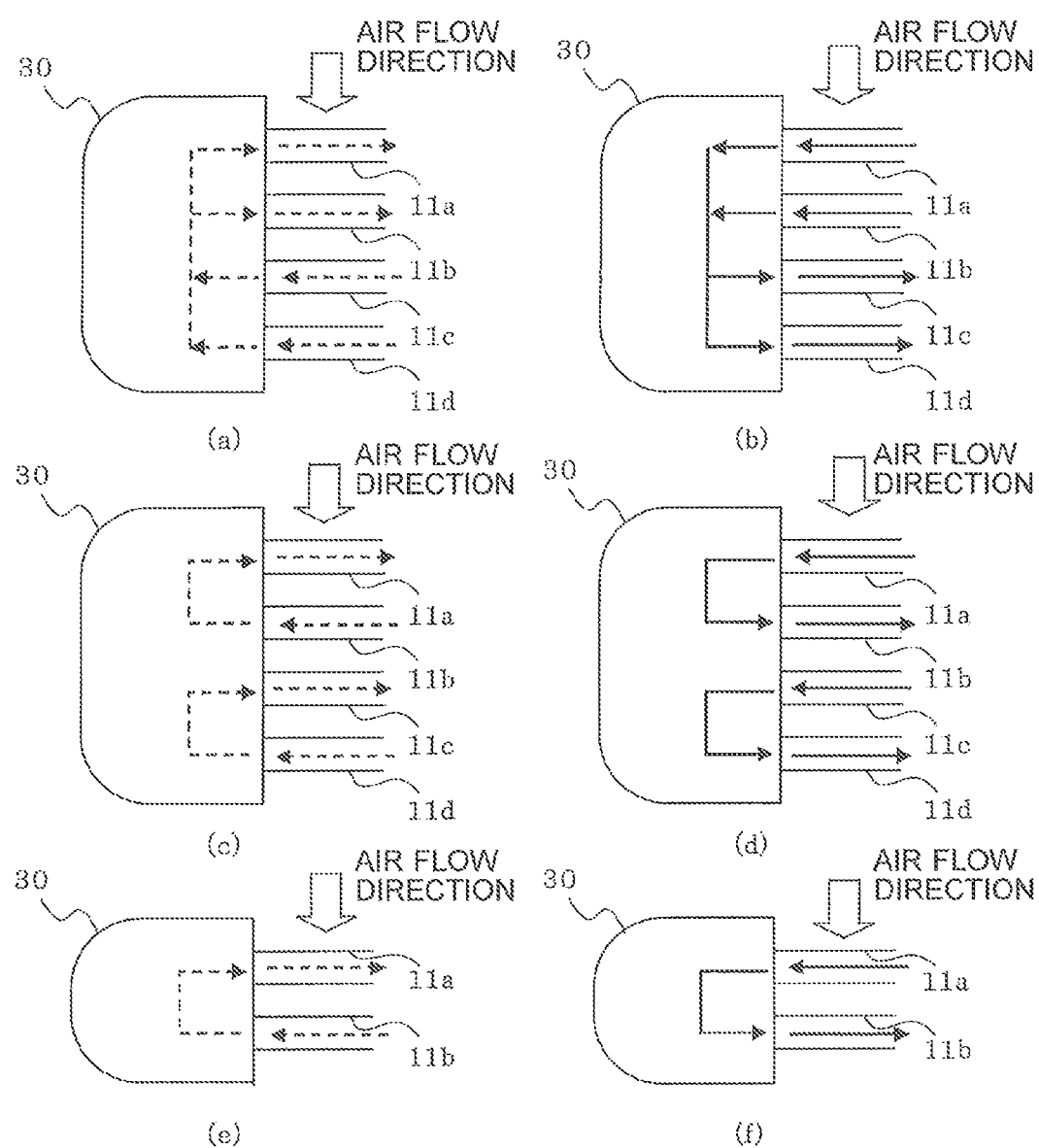
FIG. 3 is an explanatory view of a flow direction of refrigerant in the heat exchanger according to Embodiment 1 of the present invention.

FIG. 3 is an explanatory view of a flow direction of refrigerant in the heat exchanger according to Embodiment 1 of the present invention. FIGS. 3(a) to (d) show that four rows of heat exchange units 11 are provided corresponding to FIG. 1, while FIGS. 3(e), (f) show that two rows of heat exchange units 11 are provided.

In the case where the heat exchanger 1 is used as a condenser, refrigerant flows from the downstream side to the upstream side relative to the flow direction of air while being turned back as shown in FIGS. 3(a), (c), (e) (hereinafter, this flow is referred to as opposed flow). FIG. 3 generally shows two patterns of the opposed flow. FIG. 3(a) shows a pattern in which the downstream rows (heat exchange units 11c, 11d) in the flow direction in a plurality of rows of heat exchange units 11a to 11d serve as an inlet side of refrigerant, and the upstream rows (heat exchange units 11a, 11 b) serve as an outlet side of refrigerant. Specifically, refrigerant flowing from the separate headers 20c, 20d flows into the heat exchange units 11c, 11d and flows toward the header 30. Then, refrigerant flowing out of the heat exchange units 11c, 11d converges at the header 30 and is turned back in the header 30 to flow into the heat exchange units 11a, 11 b.

FIG. 3(c) shows another pattern of the opposed flow in which inlet sides and outlet sides of refrigerant are alternatively arranged in sequence from the most downstream row (heat exchange unit 11d) in the flow direction in a plurality of rows of heat exchange units 11a to 11d. Specifically, refrigerant flowing from the separate headers 20b, 20d flows into the heat exchange units 11b, 11d and flows toward the header 30. Then, refrigerant flowing out of the heat exchange units 11b, 11d is turned back in the header 30 to flow into the heat exchange units 11a, 11c.

In FIG. 3(e), since the heat exchange unit 11 has a two rows structure, there is no difference of refrigerant flow between the above two patterns. Refrigerant flowing from the individual header 20b flows into the heat exchange unit 11b, and flows toward the header 30. Then, refrigerant flowing out of the heat exchange unit 11b is turned back in the header 30 to flow into the heat exchange unit 11a.

In contrast with the opposed flow, there is also a parallel flow in which refrigerant flows from the upstream side to the downstream side relative to the flow direction of air while being turned back as shown in FIGS. 3(b), (d), (f). FIG. 3 generally shows two patterns of the parallel flow. FIG. 3(b) shows a pattern in which the upstream rows (heat exchange units 11a, 11 b) in the flow direction in a plurality of rows of heat exchange units 11a to 11d serve as an inlet side of refrigerant, and the downstream rows (heat exchange units 11c, 11d) serve as an outlet side of refrigerant. Specifically, refrigerant flowing from the separate headers 20a, 20b flows into the heat exchange units 11a, 11 b and flows toward the header 30. Then, refrigerant flowing out of the heat exchange units 11a, 11 b converges at the header 30 and is turned back in the header 30 to flow into the heat exchange units 11c, 11d.

FIG. 3(d) shows another pattern of the parallel flow in which inlet sides and outlet sides of refrigerant are alternatively arranged in sequence from the most upstream row (heat exchange unit 11a) in the flow direction in a plurality of rows of heat exchange units 11a to 11d. Specifically, refrigerant flowing from the separate headers 20a, 20c flows into the heat exchange units 11a, 11c and flows toward the header 30. Then, refrigerant flowing out of the heat exchange units 11a, 11 c is turned back in the header 30 to flow into the heat exchange units 11b, 11d.

In FIG. 3(f), since the heat exchange unit 11 has a two rows structure, there is no difference of the refrigerant flow between the above two patterns. Refrigerant flowing from the individual header 20a flows into the heat exchange unit 11a, and flows toward the header 30. Then, refrigerant flowing out of the heat exchange unit 11a is turned back in the header 30 to flow into the heat exchange unit 11b.

Next, the advantageous effect will be described for refrigerant which flows as an opposed flow when the heat exchanger 1 is used as a condenser. The advantageous effect of the opposed flow of refrigerant is related with the refrigerant temperature distribution from the inlet to outlet of the refrigerant flow path.

In a condenser, since subcooling of approximately 10 degrees Celsius is required, a sufficient amount of heat exchange with air is necessary in the outlet side of the refrigerant flow path between the inlet and the outlet.

Assuming that the condenser uses a parallel flow, which is specifically the parallel flow shown in FIG. 3(b), air with increased temperature due to heat exchange in the heat exchange units 11a, 11 b passes through the heat exchange units 11c, 11d. On the other hand, refrigerant in the outlet side of the refrigerant flow path (heat exchange units 11c, 11d) has a temperature lower than that in the inlet side (heat exchange units 11a, 11b) and closer to the air temperature. As a consequence, in the case of parallel flow, since a sufficient difference in temperature between refrigerant and air is not achieved in the outlet side of the refrigerant flow path, a desired subcooling may not be provided. On the other hand, in the case of opposed flow, a sufficient difference in temperature can be achieved since heat exchange is performed between refrigerant in the outlet side of the refrigerant flow path and air before heat exchange, and accordingly, subcooling can be provided in a stable manner.

As described above, since the heat exchange efficiency is improved by the opposed flow, required heat transfer area can be reduced and the volume of the heat exchanger can be reduced. As a result, the cost of heat exchanger can be reduced and the amount of refrigerant can be decreased. With decrease in the amount of refrigerant, the product of GWP (global warming potential) by the amount of refrigerant can be significantly reduced.

On the other hand, when the heat exchanger 1 is used as an evaporator, either of opposed flow and parallel flow may be used. Further, when the heat exchanger 1 is used as an evaporator, refrigerant becomes vapor at the refrigerant outlet of the heat exchanger 1. During evaporation of refrigerant, refrigerant becomes vapor at the outlet of refrigerant in the heat transfer tube 13, and the outlet of refrigerant of the heat transfer tube 13 has a temperature of dew point or more which is higher than that at the inlet port of refrigerant of the heat transfer tube. When both the inlet and outlet of refrigerant exist in the same row, dew is generated only at a part of heat transfer tube 13 which is adjacent to the inlet of refrigerant, which has a temperature of dew point or less, leading to increase of the amount of dew held by the heat transfer tube 13. This causes dew to be easily released from the heat transfer tube 13, leading to scattering of dew to the outside of the apparatus.

In Embodiment 1, however, since the heat transfer tube 13 having a temperature of dew point or less is provided at the upstream side of air and the outlet of refrigerant which is vapor having a temperature of dew point or more is provided at the downstream side of air, uniform temperature distribution in the level direction in the respective rows can be achieved. Accordingly, dew can be uniformly held in the rows on the upstream side of air, thereby preventing scattering of dew.

As described above, according to Embodiment 1, the header 20 on the other end of the heat exchange units 11 that constitute the heat exchange unit group 10 are made up of a plurality of separate headers 20a to 20d which are independent for each of the heat exchange units 11. Accordingly, even if the heat exchange unit group 10 has one or more bend sections 15 and a plurality of rows of heat exchange units 11, the heat exchanger 1 can be bent after the heat transfer tube 13, the fin 12 and the headers 20, 30 are brazed with each other. As a result, the manufacturing cost can be reduced with increase in productivity.

Further, since the heat transfer tube 13 is a flat tube, heat exchange performance can be improved by reducing the pressure loss of air and reducing the diameter of flow path. Reducing the diameter of flat shaped flow path can reduce zone of stagnation in a heat transfer tube outlet side compared with the case of reducing the diameter of flow path of circular tube, thereby improving heat exchange efficiency of the heat exchanger 1. Further, since the flat shape can reduce separation of air, the pressure loss of air can be reduced and thus input of fan (not shown in the figure) that sends air to the heat exchanger 1 can also be reduced. Therefore, the heat exchanger 1 of Embodiment 1 can provide the air-conditioning apparatus having high energy saving effect.

In addition to the fact that a typical flat tube has a small flow path, the flat tube of Embodiment 1 is bent at the bend section 15, which causes increase of pressure loss of refrigerant to be increased. In this case, it is usually required to increase the number of paths or divide the heat exchanger. However, according to a configuration of Embodiment 1, a flat tube having a high pressure loss can be used on the basis of the following reasons. That is, although the bend section 15 is formed in the heat exchanger 1, the inlet or outlet ports of refrigerant are independent by the separate headers 20a to 20d. Accordingly, compared with the case where the inlet or outlet ports of refrigerant are formed in a hair pin structure, the number of paths (the number of paths through which refrigerant flows; 40 paths in the example shown in FIG. 1) which is equal to or more than the number of rows (20 rows in the example shown in FIG. 1) is possible by providing the header. Thus, a flat tube having a high pressure loss can be used. Accordingly, the heat exchanger 1 with the amount of refrigerant being significantly reduced due to reduction in diameter of flow path can be provided.

The heat exchanger of the present invention is not limited to the configuration shown in FIG. 1, and various modifications can be made as described below without departing from the principle of the present invention. In this case, the same operation and effect can be achieved.

(Modification 1)

Figure 4:
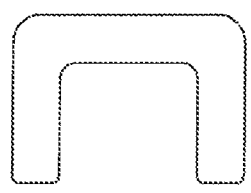
FIG. 4 is a view showing Modification 1 of the heat exchanger according to Embodiment 1 of the present invention.
Figure 4:
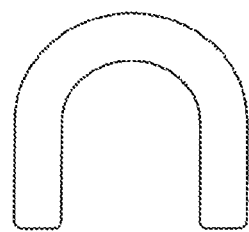
Figure 4:
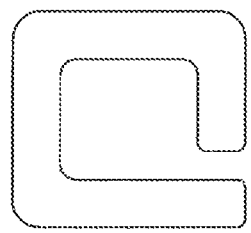

FIG. 4 shows a view of Modification 1 of the heat exchanger according to Embodiment 1 of the present invention.

Although FIG. 1 shows an example of the heat exchange unit group 10 generally formed in a substantially L-shape, an I-shaped heat exchange unit group 10 may be bent in a substantially right angle at two positions as shown in FIG. 4(a), in a U-shape as shown in (b), or in a rectangular shape by bending it at three positions as shown in (c).

Embodiment 2

Although the positions of the separate headers 20a to 20d in the above Embodiment 1 are aligned in the row direction, the positions of a plurality of separate headers 20a to 20d in Embodiment 2 are different from the adjacent row in the fin-stacking direction of the fins 12. Since the header 30 has the configuration which is common for the adjacent rows, the position of the header 30 is the same for the adjacent rows in the fin-stacking direction and is not different in the fin-stacking direction. Accordingly, in two headers 20, 30 of Embodiment 2, the positions of a plurality of separate headers 20a to 20d are different from the adjacent row in the fin-stacking direction of the fin 12. The remaining configuration is the same as that of Embodiment 1, and the following description will be provided focusing on the configuration of Embodiment 2 different from that of Embodiment 1.

Figure 5:
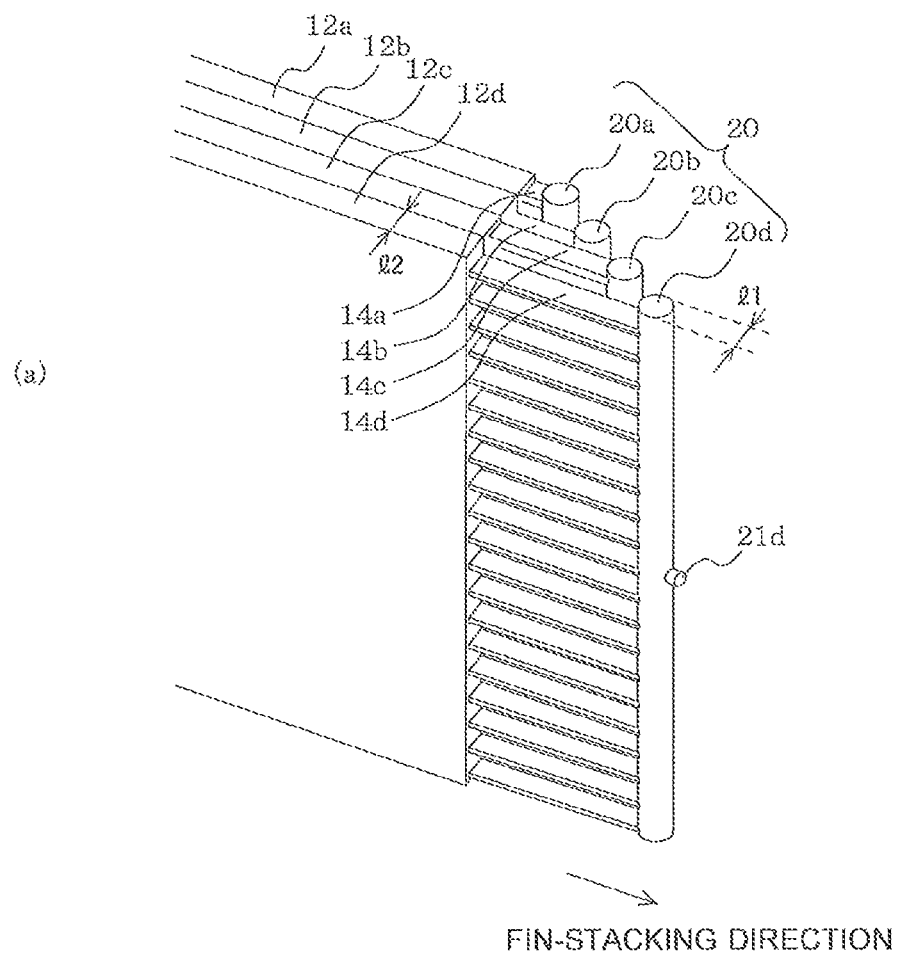
FIG. 5 is a view showing the surroundings of an individual header which is an essential part of the heat exchanger according to Embodiment 2 of the present invention.
Figure 5:
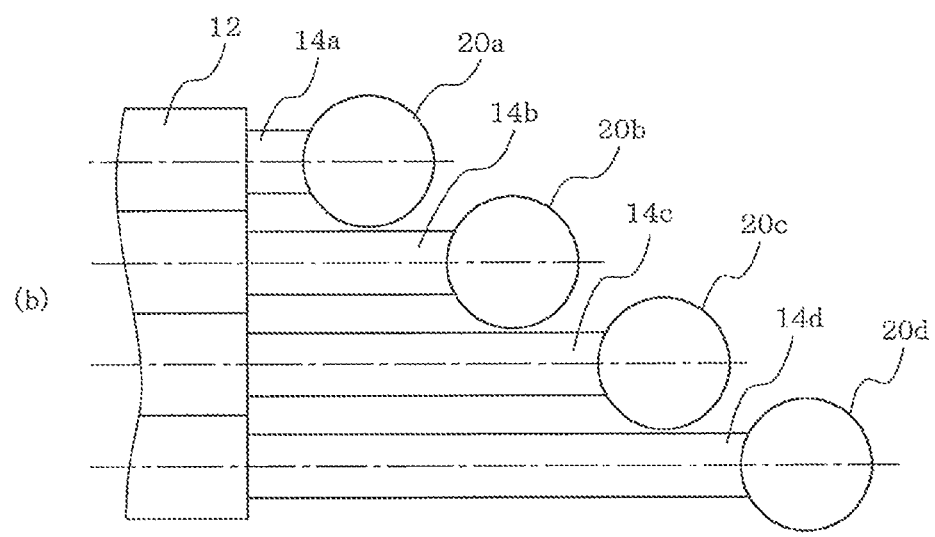

FIG. 5 is a view showing an individual header which is an essential part of the heat exchanger according to Embodiment 2 of the present invention, and the neighborhood, and (a) shows a perspective view and (b) shows a plan view. In FIG. 5(b), the dashed and dotted line indicates a center axis of the heat transfer tube 13.

As shown in FIG. 5, in Embodiment 2, the positions of the separate headers 20a to 20d are different from the adjacent row. Specifically, since the lengths of the projecting portions 14a to 14d (hereinafter, collectively simply referred to as projecting portion 14) of the heat transfer tubes 13 which extend from the end of the fins 12a to 12d on which the header 20 is located are different from the adjacent row, the positions of the separate headers 20a to 20d are different from the adjacent row. In Embodiment 2, a space is secured due to the positions of a plurality of separate headers 20a to 20d that are different from the adjacent row so that the volume of the header of the separate headers 20a to 20d can be increased by using this space.

That is, when the positions of the separate headers 20a to 20d are aligned in the row direction as shown in FIG. 1, the length l1 of the separate headers 20a to 20d in the row direction is the length l2 at a maximum, which is the width of the fin 12 in the level direction, considering the adjacent separate headers 20a to 20d are disposed not to interfere each other. However, when the positions of the separate headers 20a to 20d are different from the adjacent row in the fin-stacking direction of the fin 12, a space is formed in which the separate headers 20a to 20d can be expanded. Accordingly, it is possible to increase the length l1 of the separate headers 20a to 20d in the row direction to be larger than the length of the fin 12 in the level direction by using this space. This allows for the header 20 (separate headers 20a to 20d) to be increased in size. Further, FIG. 5 shows an example of the separate headers 20a to 20d having the increased volume with the centers of the separate headers 20a to 20d in the row direction (up and down direction of FIG. 5) being aligned with the center axes of the heat transfer tubes 13.

As described above, according to Embodiment 2, the same effect as that of Embodiment 1 can be obtained. Further, the header 20 can be increased in size by positioning the separate headers 20a to 20d at positions different from the adjacent row compared with the case in which the positions are aligned in the row direction.

The heat exchanger of the present invention is not limited to the configuration shown in FIG. 5, and various modifications can be made as described below without departing from the principle of the present invention. In this case, the same operation and effect can be achieved.

(Modification 1)

Figure 6:
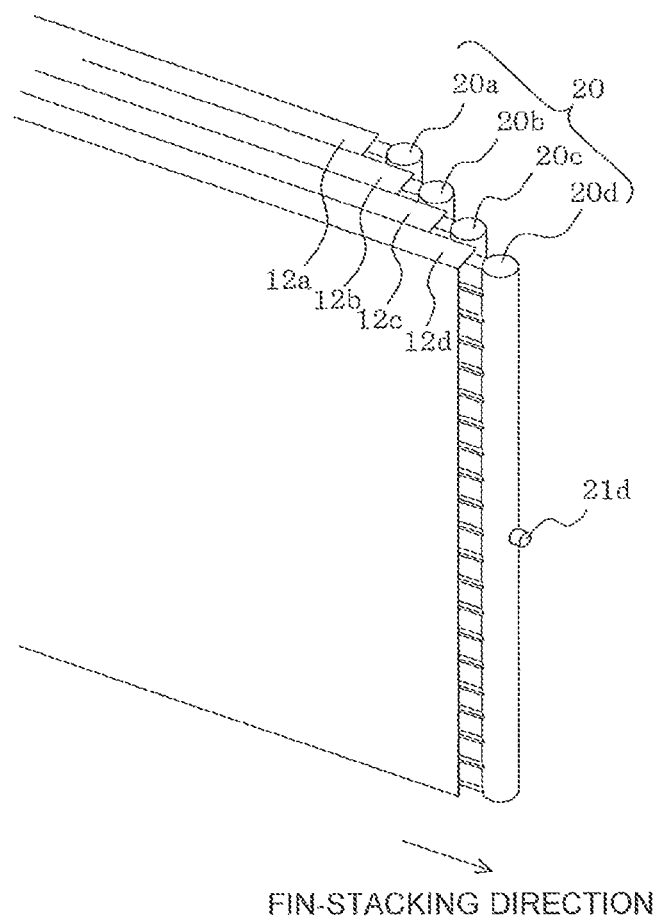
FIG. 6 is a view showing Modification 1 of the heat exchanger according to Embodiment 2 of the present invention.

FIG. 6 is a view showing Modification 1 of the heat exchanger according to Embodiment 2 of the present invention.

Although the fin 12 is not provided at the projecting portion 14 in FIG. 5, the fin 12 (12a to 12d) is disposed in FIG. 6. In this configuration, heat transfer area can be increased compared with the configuration shown in FIG. 5.

(Modification 2)

Figure 7:
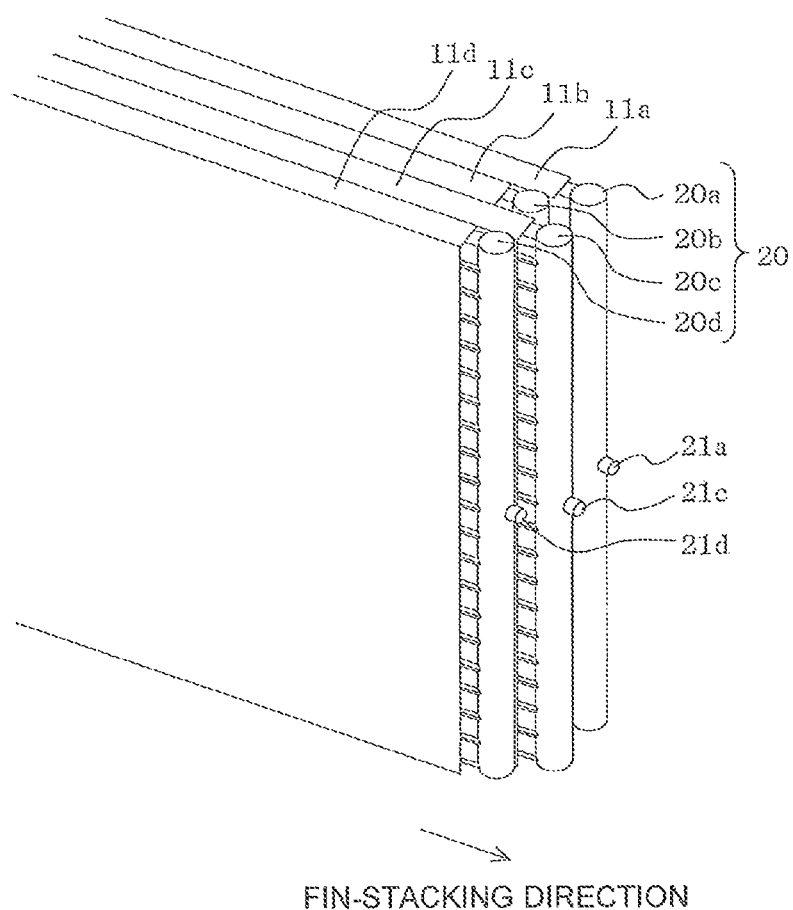
FIG. 7 is a view showing Modification 2 of the heat exchanger according to Embodiment 2 of the present invention.

FIG. 7 is a view showing Modification 2 of the heat exchanger according to Embodiment 2 of the present invention.

In FIG. 5, the separate headers 20a to 20d are positioned forward in sequence in the fin-stacking direction of the fins 12 from the innermost row (the uppermost row in FIG. 5) to the outermost row (the lowermost row in FIG. 5) of the heat exchange unit group 10. On the other hand, in FIG. 7, the separate headers 20a to 20d are positioned forward and backward in an alternating manner from the innermost row (the uppermost row in FIG. 7) to the outermost row (the lowermost row in FIG. 7) of the bend section 15. This configuration is used, for example, for refrigerant having the flow as shown in FIGS. 3(c), (d).

(Modification 3)

Figure 8:
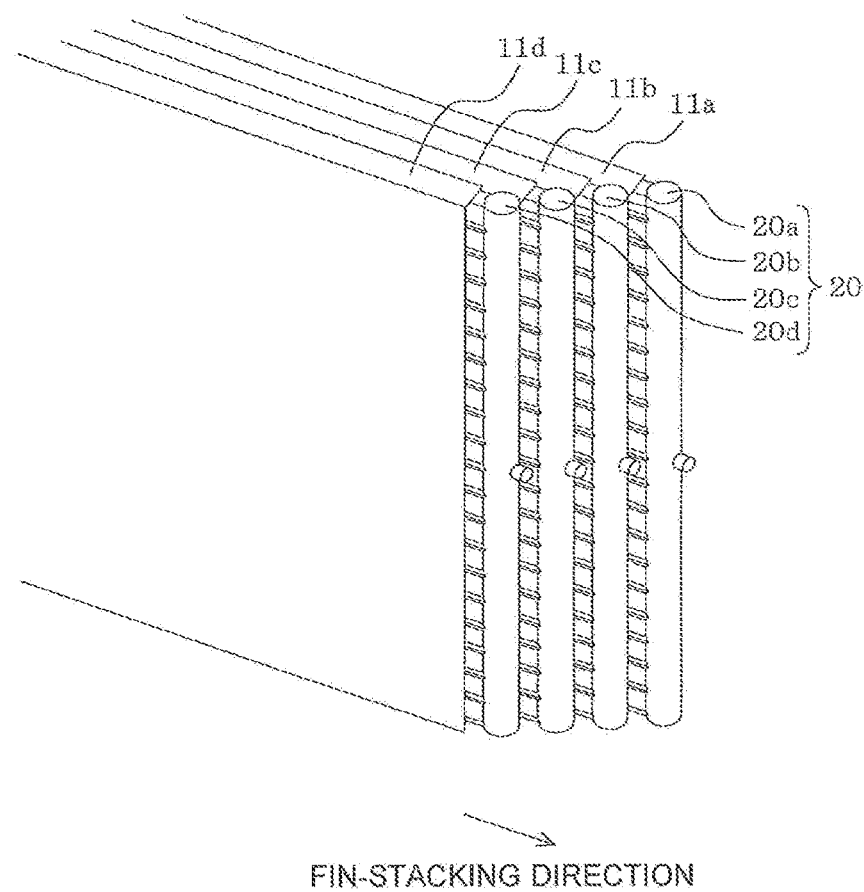
FIG. 8 is a view showing Modification 3 of the heat exchanger according to Embodiment 2 of the present invention.

FIG. 8 is a view showing Modification 3 of the heat exchanger according to Embodiment 2 of the present invention.

As described above, in FIG. 5, the separate headers 20a to 20d are positioned offset from each other in the fin-stacking direction of the fins 12 from the one header to the plurality of separate headers, in a manner of projecting stepwise from the innermost row (the uppermost row in FIG. 5) to the outermost row (the lowermost row in FIG. 5) of the heat exchange unit group 10. On the other hand, in FIG. 8, the separate headers 20a to 20d are positioned offset from each other in the fin-stacking direction of the fin 12 from the one header to the plurality of separate headers, in a manner of projecting stepwise from the innermost row (the uppermost row in FIG. 8) to the outermost row (the lowermost row in FIG. 8) of the heat exchange unit group 10.

Embodiment 3

Although Embodiment 2 does not specifically consider downsizing of the installation space of the separate headers 20a to 20d, Embodiment 3 is provided to increase the volume of the separate headers 20a to 20 while downsizing the installation space of the separate headers 20a to 20d.

Figure 9:
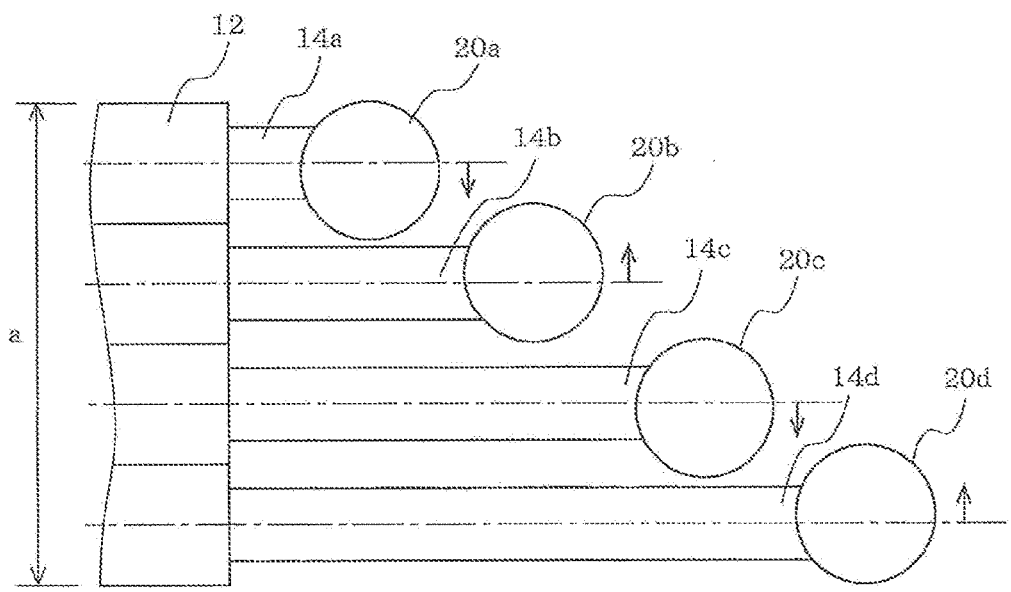
FIG. 9 is a plan view which shows the surroundings of the individual header which is an essential part of the heat exchanger according to Embodiment 3 of the present invention.

FIG. 9 is a plan view which shows the surroundings of an individual header which is an essential part of the heat exchanger according to Embodiment 3 of the present invention.

In Embodiment 2 shown in FIG. 5, the separate headers 20a to 20d are arranged such that the centers of the cylindrical separate headers 20a to 20d in the row direction are aligned with the center axes (dashed and dotted line in the figure) of the heat transfer tubes 13. On the other hand, in FIG. 9, the centers of the separate headers 20a to 20d in the level direction are offset toward inside between the rows such that the separate headers 20a to 20d are positioned inside relative to both ends (fin width) a of the entire fins 12 in the level direction.

As described above, according to Embodiment 3, the same effect as that of Embodiments 1, 2 can be obtained as well as the following effect. That is, the separate headers 20a to 20d are positioned inside relative to the fin width a so as to downsize the installation space of the header 20 while increasing the volume of the separate headers 20a to 20d to be larger than that shown in FIG. 1 (in which the position of the separate headers 20a to 20d are aligned in the row direction).

Embodiment 4

Although Embodiments 1 to 3 show the separate headers 20a to 20d having the same volumes, Embodiment 3 shows the separate headers 20a to 20d having different volumes. The remaining configuration is the same as that of Embodiment 3, and the following description will be provided focusing on the configuration of Embodiment 4 different from that of Embodiment 3.

Vapor refrigerant causes a large pressure loss since it has a small density and a large flow rate. On the other hand, liquid refrigerant causes a small pressure loss since it has a large density and a small flow rate. Accordingly, the volume of the vapor individual header in which vapor refrigerant passes through is decreased compared with the volume of the liquid individual header.

Figure 10:
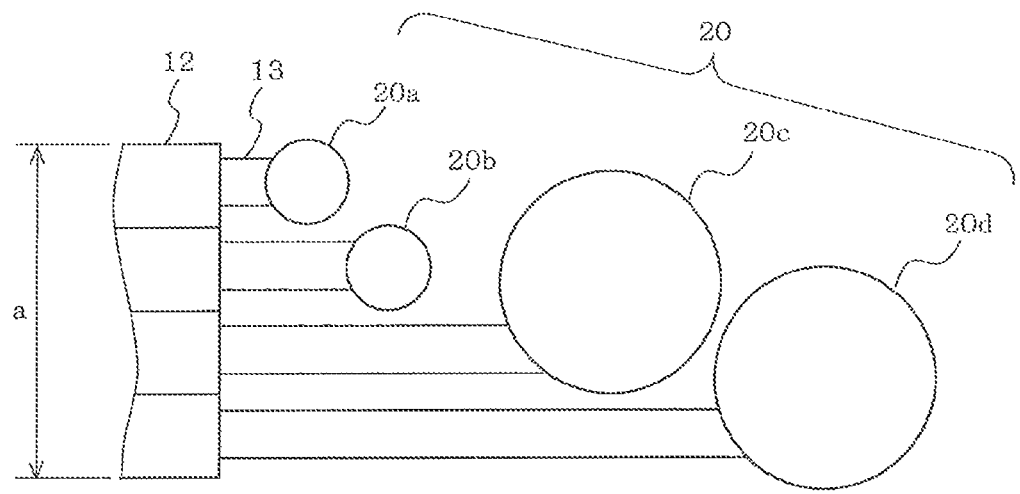
FIG. 10 is a plan view which shows the surroundings of the individual header which is an essential part of the heat exchanger according to Embodiment 4 of the present invention.

FIG. 10 is a plan view which shows the surroundings of the individual header which is an essential part of the heat exchanger according to Embodiment 4 of the present invention.

When the heat exchanger of FIG. 1 is used as a condenser, the inlet or outlet ports 21c, 21d serve as a refrigerant inlet through which vapor refrigerant flows into, and the inlet or outlet ports 21a, 21b serve as a refrigerant outlet through which liquid refrigerant flows out as shown by the dotted arrow of FIG. 1. Accordingly, in this case, the volumes of the separate headers 20c, 20d are increased and the volumes of the separate headers 20a, 20b are decreased as shown in FIG. 10. Further, in FIG. 10, the separate headers 20a to 20d are positioned inside relative to the fin width a, similarly to the configuration of Embodiment 3 shown in FIG. 9.

With the above configuration, the same effect as that of Embodiments 1 to 3 can be obtained. Further, the pressure loss in the header 20 can be reduced by deciding the volume of the separate headers 20a to 20d depending on the density of refrigerant. Further, the headers 20 can be positioned efficiently.

Embodiment 5

In Embodiments 1 to 4, the configuration of the heat exchanger 1 is described. In Embodiment 5, an air-conditioning apparatus having the heat exchanger 1 of Embodiments 1 to 4 will be described. The following description will be provided focusing on the configuration and operation of Embodiment 5 different from those of Embodiments 1 to 4.

Figure 11:
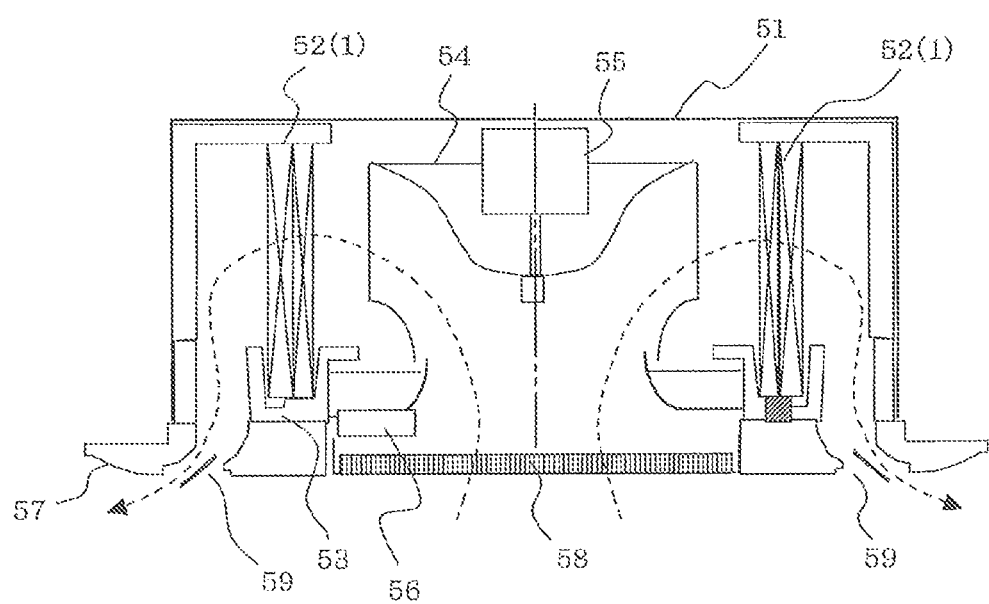
FIG. 11 is a vertical sectional view which shows an inside of an indoor unit of an air-conditioning apparatus according to Embodiment 5 of the present invention.

FIG. 11 is a vertical sectional view which shows an inside of an indoor unit of an air-conditioning apparatus according to Embodiment 5 of the present invention. In FIG. 11, the dotted arrow shows the air flow direction.

In a main body 51 of the indoor unit, two heat exchangers 52, a drain pan 53 that receives drain water generated in the heat exchanger 52 and dropped therefrom, a fan 54, a fan motor 55 that drives the fan 54, and an electric component box 56. A decorative panel 57 having a substantially rectangular shape is provided on the lower side of the main body 51. An air inlet 58 is provided at around the center of the decorative panel 57 so as to suction a room air into the main body 51, and air outlet 59 is provided around the air inlet 58 so as to blow air having a conditioned temperature by cooling or heating operation of the heat exchanger 52 into the room.

In a ceiling embedded type air-conditioning apparatus having the above configuration, air suctioned from the air inlet 58 into the main body 51 exchanges heat while passing through the heat exchangers 52 to condition the temperature, and is then blown from the air outlet 59. The heat exchanger 1 of any one of Embodiments 1 to 4 is used for the heat exchanger 52.

Figure 12:
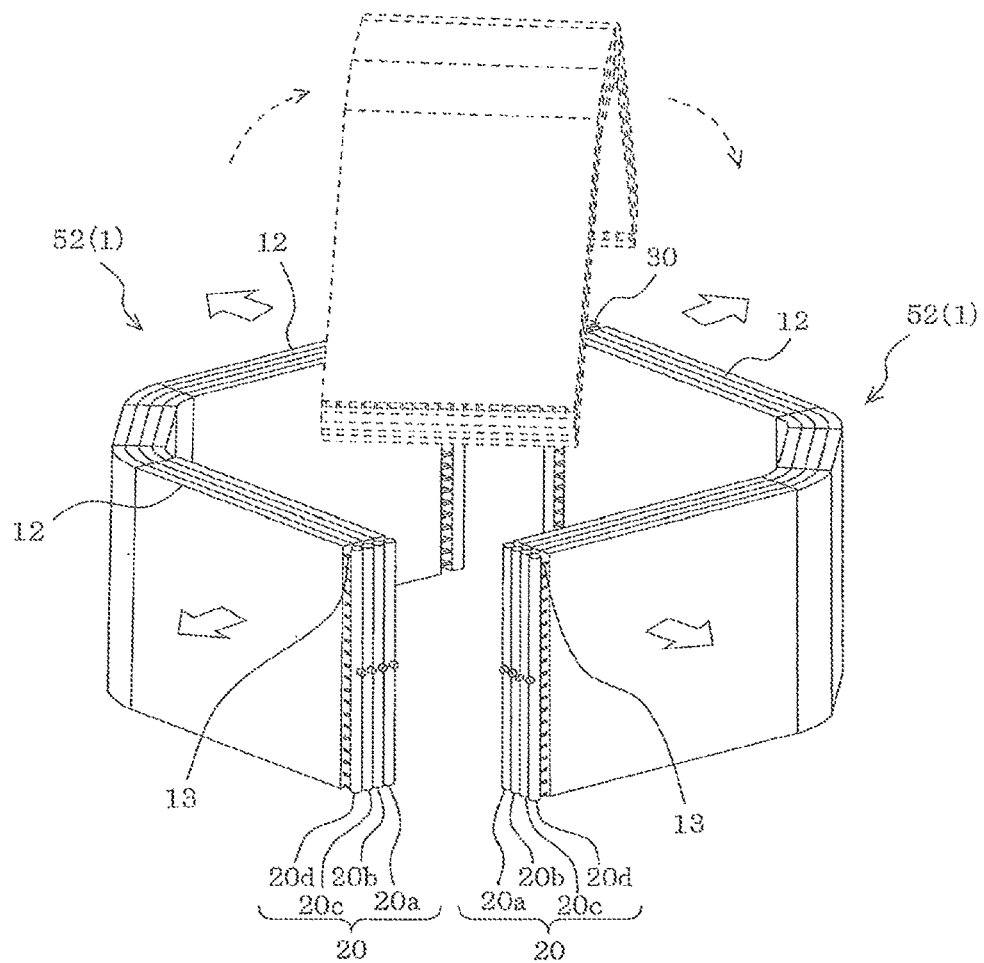
FIG. 12 is a view showing two heat exchangers provided in the indoor unit of the air-conditioning apparatus according to Embodiment 5 of the present invention.

FIG. 12 is a view showing two heat exchangers provided in the indoor unit of the air-conditioning apparatus according to Embodiment 5 of the present invention. The white arrow in FIG. 12 shows a direction of flow of air.

As shown in FIG. 12, two heat exchangers 52 are arranged to face each other with one of which being upside down to the other as indicated by the dotted line in the figure. Two heat exchangers 52 have the headers 20, 30, the distance between the fins 12 (interval), and the heat transfer tubes 13, which have the same specification. By using two heat exchangers 52 having the same specification, manufacturing cost of the heat exchanger can be reduced in manufacturing of the indoor unit.

Further, in use of the heat exchanger 52 as a condenser, when the refrigerant flow direction is opposed flow and the heat exchanger 1 has a configuration in which the separate headers 20a to 20d have different volumes for vapor refrigerant and liquid refrigerant such as those shown in FIG. 10, it is desirable that two heat exchangers 52 are used under the same condition. In this case, since the heat exchangers 52 are arranged to face each other with one of which being upside down to the other, the separate headers having a small volume and the individual header having a large volume are arranged in the same order with respect to the air flow direction. Accordingly, the heat exchangers 52 can be used under the same condition.

Further, since the heat exchangers 52 are positioned to surround an outer periphery of the circular shaped fan 54, a distance between the fan 54 and the heat exchanger 52 are uniform. As a result, the air flow rate of the heat exchanger 52 becomes uniform, and the fan 54 and the heat exchangers 52 are arranged with high heat exchange efficiency. As the heat exchange performance increases, the amount of refrigerant necessary for a desired cooling or heating capacity can be reduced. Further, since the inlet or outlet pipes for refrigerant can be provided at one position, the length of the surrounding pipe can be reduced compared with the case in which the inlet or outlet pipes for refrigerant are provided at two or more positions, thereby reducing the cost.

As described above, according to Embodiment 5, the air-conditioning apparatus having the same effect as that of Embodiments 1 to 4 can be obtained.

Embodiment 6

In the above Embodiment 5, two heat exchangers 52 have the headers 20, 30, the distance between the fins 12 (interval), and the heat transfer tubes 13, which have the same specification, and the two heat exchangers 52 are arranged to face each other with one of which being upside down to the other. In Embodiment 6, two heat exchangers 52 have the headers 20, 30, the distance between the fins 12, the heat transfer tubes 13, which have the same specification and are bent in the opposite directions to form the bend sections 15, and the two heat exchangers 52 are arranged to face each other. The remaining configuration is the same as that of Embodiment 5, and the following description will be provided focusing on the configuration of Embodiment 6 different from that of Embodiment 5.

Figure 13:
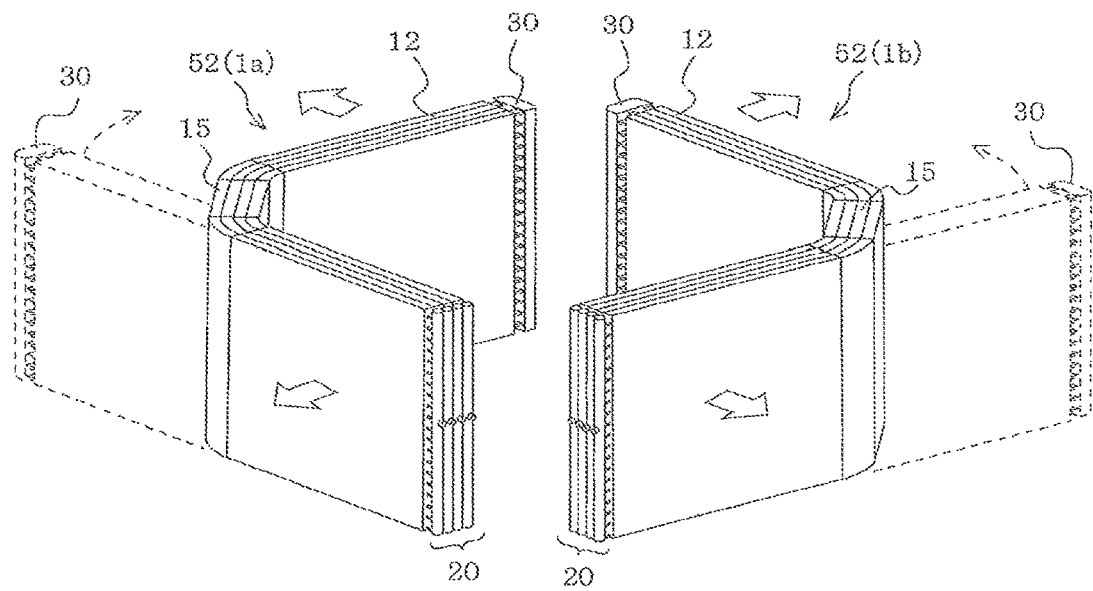
FIG. 13 is a view showing two heat exchangers provided in the indoor unit of the air-conditioning apparatus according to Embodiment 6 of the present invention.

FIG. 13 is a view showing two heat exchangers provided in the indoor unit of the air-conditioning apparatus according to Embodiment 6 of the present invention. The white arrow in FIG. 13 shows a flow of air.

As shown in FIG. 13, in the two heat exchangers 52 (1a, 1b), the portion of the left heat exchanger 1a which includes the header 30 is bent to the right side of FIG. 13 as indicated by the dotted arrow, while the portion of the right heat exchanger 1b which includes the header 30 is bent to the left side of FIG. 13 as indicated by the dotted arrow. The two heat exchangers 52 have the headers 20, 30, the distance between the fins 12, the heat transfer tubes 13, which have the same specification, except that the bend sections 15 are oriented to the opposite directions. Accordingly, manufacturing of the heat exchangers 52 (1a, 1b) that are incorporated into the main body 51 (see FIG. 11) can be performed in the same manner except for the bending process for bending the heat exchangers 52 (1a, 1b) in the opposite directions. Accordingly, the production efficiency can be improved and the production cost can be reduced.

Although not described in the above description, the headers 20, 30 can be configured to communicate in the level direction, or alternatively, one or a plurality of partitions can be provided in the level direction. When the partitions are provided in the level direction, the partitions may be positioned at regular intervals or different intervals. Further, the intervals between the heat transfer tubes 13 which are adjacent in the level direction may be different in the level direction. In the case where the specifications of the headers 20, 30 and the arrangement of the heat transfer tubes 13 are different in the level direction, if one of the heat exchangers 52 are turned upside down to the other of the heat exchangers 52 in the manner described in Embodiment 5, the up side and down side of the specifications of the headers 20, 30 and the arrangement of the heat transfer tubes 13 becomes opposite to each other in the level direction. Accordingly, when the heat exchangers 52 having the specifications of the headers 20, 30 and the arrangement of the heat transfer tubes 13 which are different in the level direction are used, it is appropriate to use the configuration of Embodiment 6.

As described above, according to Embodiment 6, the air-conditioning apparatus having the same effect as that of Embodiments 1 to 4 can be obtained. Further, according to Embodiment 6, the heat exchanger having high heat exchange performance and high resistance to dew formation can be provided similarly to Embodiment 5.

Embodiment 7

In Embodiments 5, 6, the air-conditioning apparatus having the heat exchanger 1 of Embodiments 1 to 4 are described. In Embodiment 7, a refrigeration cycle apparatus having the heat exchanger 1 of Embodiments 1 to 4 will be described.

Figure 14:
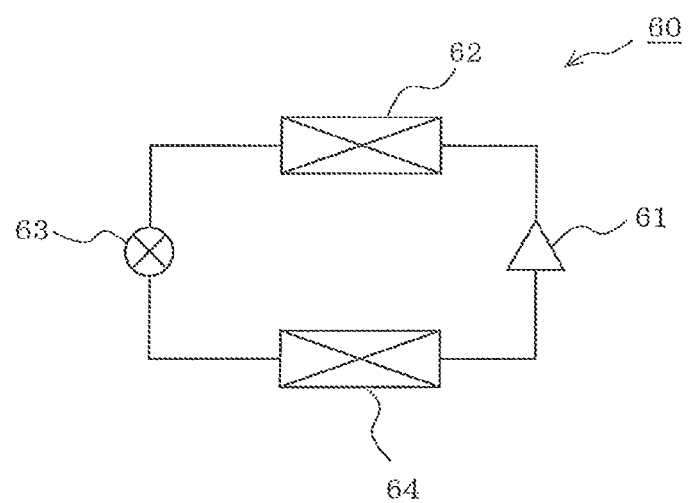
FIG. 14 is a view showing a refrigerant circuit of a refrigeration cycle apparatus according to Embodiment 7 of the present invention.

FIG. 14 is a view showing a refrigerant circuit of a refrigeration cycle apparatus according to Embodiment 7 of the present invention.

A refrigeration cycle apparatus 60 includes a refrigerant circuit made up of a compressor 61, a condenser (including a gas cooler) 62, an expansion valve 63 as a pressure decreasing device, and an evaporator 64, which are connected together in sequence by a refrigerant pipe. The heat exchanger 1 is used for at least one of the condenser 62 and the evaporator 64.

In the refrigeration cycle apparatus 60 having the above configuration, refrigerant discharged from the compressor 61 flows into the condenser 62, exchanges heat with air that passes through the condenser 62 and flows out as a high pressure liquid refrigerant. The high pressure liquid refrigerant which flows out from the condenser 62 is decompressed by the expansion valve 63, becomes a low pressure two-phase refrigerant, and flows into the evaporator 64. The low pressure two-phase refrigerant which flows into the evaporator 64 exchanges heat with air that passes through the evaporator 64, becomes a low pressure vapor refrigerant, and is then suctioned again into the compressor 61.

According to Embodiment 7, the same effect as that of Embodiments 1 to 4 can be obtained. In addition, the refrigeration cycle apparatus 60 with energy saving effect, high reliability, low refrigerant amount (low GWP), and low cost can be obtained.

The configuration of the refrigerant circuit is not limited to that shown in FIG. 14, and may include a four-way valve and the like that switches the flow direction of refrigerant discharged from the compressor 61.

Although the inside structure of the headers 20, 30 is not specifically described in the above Embodiments, the header 20 which serves as a refrigerant inlet when the heat exchanger 1 is used as a condenser includes a unit for uniformly distributing refrigerant. Any technique may be used as appropriate for the unit for uniformly distributing refrigerant.

While the heat transfer tube 13 is a flat tube in the above Embodiments, it is not necessarily a flat tube and may be a circular tube.

While the headers 20, 30 are cylindrical shape in the above Embodiments, they are not necessarily a cylindrical shape and may be a cuboid shape.

Although the above Embodiments 1 to 7 are described as separate embodiments, the heat exchanger, the refrigeration cycle apparatus and the air-conditioning apparatus can be provided by combining characteristic configurations and operations of the above Embodiments as appropriate. Further, Modifications that are applied to the same configurations in each of Embodiments 1 to 7 may also be applied to Embodiment other than that describes the Modification.

INDUSTRIAL APPLICABILITY

As an application example of the present invention, the present invention may be applied to various apparatuses for industrial use and household use which include a heat exchanger such as an air-conditioning apparatus.

| Reference Signs List |
|---|
| 1 heat exchanger    1a heat exchanger    1b heat exchanger   10 heat exchange unit group    11 heat exchange unit    11a to 11d heat exchange unit    12 fin    12a to 12d fin    13 heat transfer tube    13a to 13d heat transfer tube    13e through hole    14 projecting portion    14a to 14d projecting portion    15 bend section    20 header    20a to 20d individual header    21a to 21d inlet or outlet port    30 header    51 main body    52 heat exchanger    53 drain pan    54 fan    55 fan motor    56 electric component box    57 decorative panel    58 air inlet    59 air outlet    60 refrigeration cycle apparatus    61 compressor    62 condenser    63 expansion valve    64 evaporator |

The invention claimed is:

1. A heat exchanger comprising:
   a heat exchange unit group made up of a plurality of heat exchange units arranged adjacent to one another in a row direction and including one or more bend sections bent in the row direction, the row direction being a direction of air flow,
   each heat exchange unit of the plurality of heat exchange units including
      a plurality of heat transfer tubes configured to allow refrigerant to pass therethrough, the heat transfer tubes being arrayed in a level direction, the level direction being perpendicular to the direction of air flow, and
      a plurality of fins stacked in a fin-stacking direction and configured to allow air to pass in the air flow direction, the fin-stacking direction being perpendicular to the level direction and the direction of airflow; and
   headers disposed on both ends of the heat exchange unit group, the headers being connected with ends of the plurality of heat transfer tubes,
   the headers including
      one header provided on one end of the heat exchange unit group in common for the plurality of rows of the heat exchange units, and
      a plurality of separate headers provided separately for the heat exchange units on another end of the heat exchange unit group, each of the plurality of separate headers being arranged at a different position in the fin-stacking direction,
   wherein the separate headers are provided on respective portions of the plurality of heat transfer tubes which project stepwise in the fin-stacking direction to position the plurality of separate headers offset from each other, the portions of the plurality of heat transfer tubes and the plurality of separate headers more projecting in upstream than downstream of the air flowing between the plurality of fins, and
   the plurality of fins is stacked across the heat transfer tubes including the portions projecting of the heat transfer tubes between the one header and the separate headers.

2. The heat exchanger of claim 1, wherein a volume of the plurality of separate headers is increased by using a space secured by positioning the plurality of separate headers at positions different between adjacent rows of the heat exchange units, the positions being different in the fin-stacking direction.

3. The heat exchanger of claim 2, wherein the plurality of separate headers is positioned inside a combined width of the plurality of fins relative to the row direction of the plurality of fins.

4. The heat exchanger of claim 1, wherein a part of the plurality of separate headers has a volume different from a volume of other parts of the plurality of separate headers.

5. The heat exchanger of claim 4, wherein the part of the plurality of separate headers serves as an inlet or outlet for vapor refrigerant and the other parts of the plurality of separate headers serves as an inlet or outlet for liquid refrigerant, and the volume of the part of the separate headers for vapor refrigerant is larger than the volume of each of the other parts of the separate headers for liquid refrigerant.

6. The heat exchanger of claim 1, wherein the heat transfer tube is a flat tube.

7. An air-conditioning apparatus comprising two heat exchangers of claim 1, wherein the two heat exchangers are placed upside down to each other and to face each other.

8. An air-conditioning apparatus comprising two heat exchangers of claim 1, having the one or more bend sections oriented in opposite directions, wherein the two heat exchangers are arranged to face each other.

9. The air-conditioning apparatus of claim 7, wherein the two heat exchangers have a same specification for the header disposed on each of ends of the heat exchange unit group, an interval of the plurality of fins, and the plurality of heat transfer tubes.

10. A refrigeration cycle apparatus comprising the heat exchanger of claim 1.

11. A method for manufacturing the heat exchanger of claim 1, the method comprising forming the one or more bend sections by performing one or more bending processes in the row direction after brazing the fins of the heat exchange unit group, the plurality of heat transfer tubes and the headers disposed on each of ends of the heat exchange unit group with each other.

12. The method for manufacturing the heat exchanger of claim 11, wherein the bending process is performed while the header on one end of the heat exchange unit group is fixed in position.

* * * * *